United States Patent
Sethi

(10) Patent No.: US 10,086,804 B2
(45) Date of Patent: Oct. 2, 2018

(54) LANDING GEAR FOR POWER GENERATION UNIT TRAILER SYSTEM AND METHOD OF ANCHORING TRAILER SYSTEM

(71) Applicant: General Electric Company, Schenectady, NY (US)

(72) Inventor: Vineet Sethi, Sugar Land, TX (US)

(73) Assignee: General Electric Company, Schenectady, NY (US)

(*) Notice: Subject to any disclaimer, the term of this patent is extended or adjusted under 35 U.S.C. 154(b) by 2 days.

(21) Appl. No.: 15/705,424

(22) Filed: Sep. 15, 2017

(65) Prior Publication Data

US 2018/0001874 A1    Jan. 4, 2018

Related U.S. Application Data

(62) Division of application No. 14/918,611, filed on Oct. 21, 2015, now Pat. No. 9,802,584.

(51) Int. Cl.
*B60S 9/02* (2006.01)
*B60S 9/22* (2006.01)

(52) U.S. Cl.
CPC .. *B60S 9/02* (2013.01); *B60S 9/22* (2013.01)

(58) Field of Classification Search
None
See application file for complete search history.

(56) References Cited

U.S. PATENT DOCUMENTS

| | | | |
|---|---|---|---|
| 6,250,615 B1 | 6/2001 | Leibach | |
| 6,765,304 B2 | 7/2004 | Baten et al. | |
| 6,786,051 B2 | 9/2004 | Kristich et al. | |
| 6,871,504 B2 | 3/2005 | Kuroki et al. | |
| 8,587,136 B2 | 11/2013 | Williams | |
| 2005/0103017 A1* | 5/2005 | Kuroki | F01D 25/285 60/796 |
| 2006/0226612 A1* | 10/2006 | Smith | B60P 3/00 280/6.153 |
| 2012/0153634 A1* | 6/2012 | Williams | F01K 13/00 290/1 R |

OTHER PUBLICATIONS

U.S. Appl. No. 14/918,611, Office Action 1 dated Feb. 24, 2017, 13 pages.
U.S. Appl. No. 14/918,611, Final Office Action 1 dated May 2, 2017, 13 pages.
U.S. Appl. No. 14/918,611, Notice of Allowance dated Aug. 15, 2017, 5 pages.
U.S. Appl. No. 15/705,418, Office Action dated Oct. 5, 2017, 14 pages.
U.S. Appl. No. 15/705,418, Final Office Action dated Apr. 11, 2018, 13 pages.

* cited by examiner

*Primary Examiner* — John D Walters
*Assistant Examiner* — Hilary L Johns
(74) *Attorney, Agent, or Firm* — Ernest G. Cusick; Hoffman Warnick LLC

(57) ABSTRACT

Various embodiments of the disclosure include a power generation unit trailer system. A first aspect of the disclosure provides for a landing gear for a power generation unit trailer system. The landing includes: a support configured for attaching to a base of the power generation unit trailer; and a vibration isolator attached to the support and configured to anchor the support to a foundation beneath the base.

6 Claims, 8 Drawing Sheets

LANDING GEAR FOR POWER GENERATION UNIT TRAILER SYSTEM AND METHOD OF ANCHORING TRAILER SYSTEM

BACKGROUND OF THE INVENTION

The subject matter disclosed herein relates to power generation unit trailer systems. Specifically, the subject matter disclosed herein relates to landing gears for power generation unit trailer systems and methods of anchoring the trailer system to a foundation.

There is often a need for electric power generation in locations where permanent power is not available such as, for example, disaster sites or hospitals which have lost all other sources of power. Mobile power generation units have been employed to provide power at these locations. Conventional mobile power generation units may be provided on several trailers that may each hold various parts of the power generation unit. A conventional mobile power generation unit trailer 10 is shown in FIG. 1. Trailer 10 may include landing gears 20 that may be adjusted to contact a foundation 14 beneath the trailer 10 in order to provide support during use of the power generation unit. Landing gears 20 are generally comprised of hollow metal legs which merely contact foundation 14. Mobile power generation units are advantageous due to their mobility and quick install time. However, they do not provide sufficient support and stability to withstand high loads or winds. Additionally, purchasers of these mobile power generation units may want to convert these units into permanently installed units with minimal modifications.

BRIEF DESCRIPTION OF THE INVENTION

Various embodiments of the disclosure include a power generation unit trailer system. A first aspect of the disclosure provides for a landing gear for a power generation unit trailer system. The landing includes: a support configured for attaching to a base of the power generation unit trailer; and a vibration isolator attached to the support and configured to anchor the support to a foundation beneath the base.

A second aspect of the disclosure provides for a power generation unit trailer system. The power generation unit trailer system may include: a first trailer including: a first base configured to support a power generation unit; and a first set of landing gears attached to the first base, the first set of landing gears including: a first landing gear having a first support attached to the first base; a second landing gear having a second support attached to the first base; and a third landing gear having first plate attached to the first base.

A third aspect of the disclosure provides for a method for anchoring a trailer system to a foundation beneath the trailer system, the trailer system configured to hold a power generation unit and including a generator trailer and a turbine trailer. The method may include: attaching a first landing gear to a first base of the generator trailer; adjusting the first landing gear to a predetermined height; and anchoring the first landing gear to the foundation beneath the first base of the generator trailer.

BRIEF DESCRIPTION OF THE DRAWINGS

These and other features of this disclosure will be more readily understood form the following detailed description of the various aspects of the disclosure taken in conjunction with the accompanying drawings that depict various embodiments of the disclosure, in which.

DETAILED DESCRIPTION OF THE INVENTION

The subject matter disclosed herein relates to a power generation unit trailer systems. Mobile power generation units have been used to provide power to remote or emergency areas which are otherwise not accessible to permanent power systems. Mobile power generation units were provided to supply power to these remote locations. Mobile power generation units are advantageous due to their mobility and quick install time. However, mobile power generation units are typically unable to withstand high loads and/or aggressive weather conditions, such as high winds caused by hurricanes.

Figure 2:
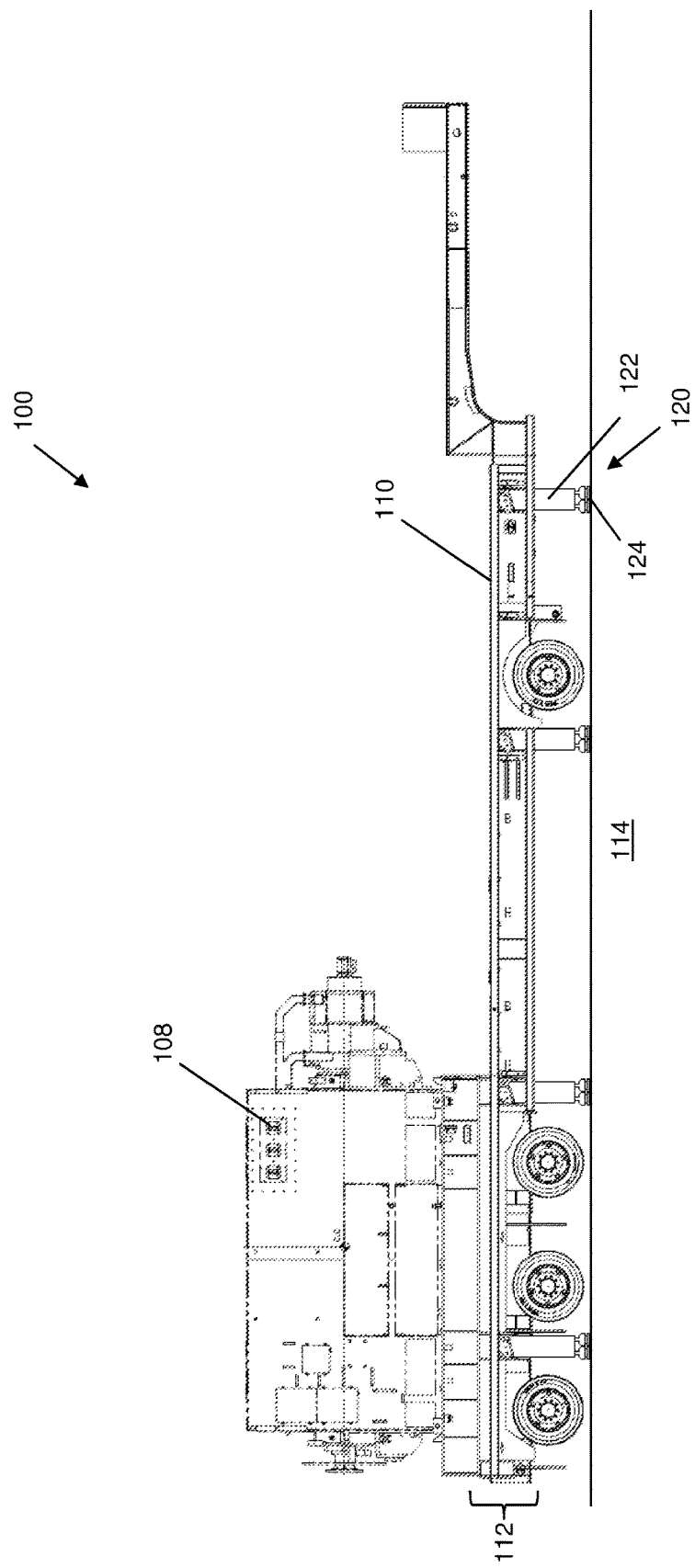
FIG. 2 shows a side view of a power generation unit trailer system according to aspects of the present disclosure.

Therefore, aspects of the present disclosure provide for robust landing gears which are anchored to the foundation beneath power generation unit trailers. Additionally, aspects of the present disclosure provide for vibration isolators which have high deflection characteristics and can withstand high shock loads. FIG. 2 shows a power generation unit trailer system 100 according to one aspect of the present disclosure. Trailer system 100 may include a trailer 110 and a set of landing gears 120. Trailer 110 may be a generator trailer configured to hold a generator 108 as shown. However, the present disclosure is equally applicable to other trailers that carry a load that requires more support than conventionally provided. As shown, conventional landing gears 20 are replaced with landing gears 120 of the present disclosure. Landing gears 120 may be placed intermittently about a perimeter of trailer 110. In some embodiments, landing gears 120 may be spaced evenly about the perimeter of trailer 110. Landing gears 120 may include a support 122 and one or more vibration isolators 124. Support 122 may be configured for attaching to a base 112 of power generation unit trailer 110. Supports 122 may be attached to base 112 via welds, bolts, screws, rivets, or other fasteners known in the art which may achieve the same purpose. Support 122 may be include solid metal, such as carbon steel, cast iron, aluminum or any other high strength metal capable of withstanding high loads. That is landing gears 120 differ from conventional landing gears in that they are solid as opposed to be hollow. Support 122 may be substantially polygonal, e.g., rectangular, or cylindrical in shape. Support 122 may be attached to base 112 at an angle of approximately 90° relative to a foundation 114 beneath base 112. As used herein "approximately" is intended to include values, for example, within 10% of the stated values. Alternatively, support 122 may be attached to base 112 at other angles relative to foundation 114 as will be described herein.

Figure 3:
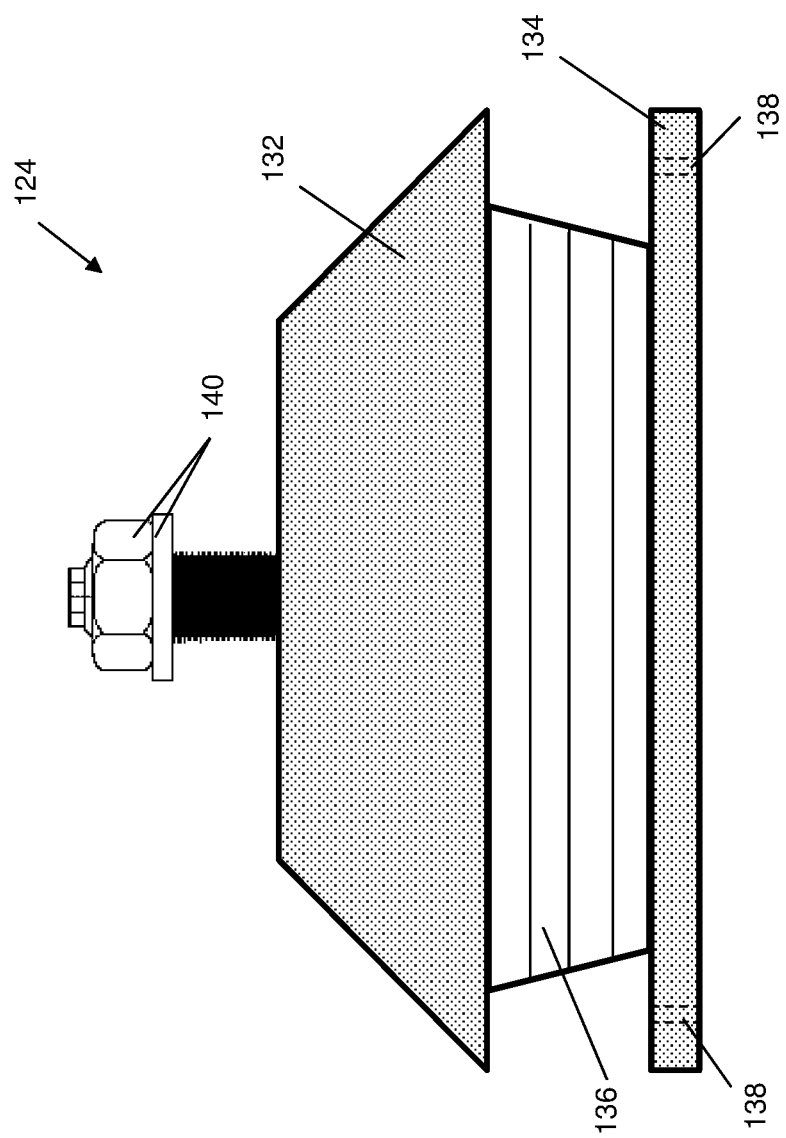
FIG. 3 shows a side view of a vibration isolator according to aspects of the present disclosure.

Vibration isolator 124 may be attached to support 122 and configured to anchor support 122 to foundation 114 beneath base 112. However, it is to be understood that in other embodiments, support 122 may be anchored to foundation 114 without the use of vibration isolators 124. Rather, support 122 may be anchored to foundation 114 directly, for example, via bolts. Bolts may be seated to foundation using any now known or later developed technique; e.g., embedded bolts, clasps, etc. In some embodiments, vibration isolator 124 may include a conical mounting from Rubber Design B.V. FIG. 3 shows a detailed view of an example of vibration isolator 124. In one embodiment, vibration isolator 124 may include an upper member 132 and a lower member 134 separated by a vibration element 136. Upper member 132 may have a substantially frustoconical shape or bell-shaped. Lower member 134 may be substantially rectangular in shape and may include a metal base plate. Members 132, 134 may include a metal such as carbon steel, cast iron, aluminum or any other high strength metal capable of withstanding high loads. A vibration element 136 may substantially separate upper member 132 and lower member 134. Vibration element 136 may absorb shock due to vibrations caused by the power generation unit during use. Vibration element 136 may include synthetic rubbers such as neoprene, ethylene propylene diene monomer, styrene butadiene, and butyl rubber, polymers, visco-elastic polymers, visco polymers, silicone, or springs. While one embodiment of a vibration isolator 124 has been shown, any other vibration isolators, elements, or members that accomplish the same may be employed. For example, in some embodiments, vibration isolator 124 may include a conical mounting from Rubber Design B.V. Referring to FIGS. 2-3 together, vibration isolator 124 may be anchored to foundation 114 via bolts (not shown) which may be inserted into bolt holes 138 of lower member 134. Bolts may be seated to foundation using any now known or later developed technique; e.g., embedded bolts, clasps, etc. Vibration isolator 124 may be attached to support 122 via bolt assembly 140 which may include, for example, a conventional bolt and nut combination. Therefore, landing gears 120 provide greater stability and load tolerance than conventional landing gears due to the robust supports 122 and being anchored to foundation 114. Landing gears 120 may withstand a load of approximately 20,000 pounds (lbs) or greater. Additionally, vibration isolators 124 prevent damage to power generation unit trailer system 100 due to shock during high load conditions.

Figure 4:
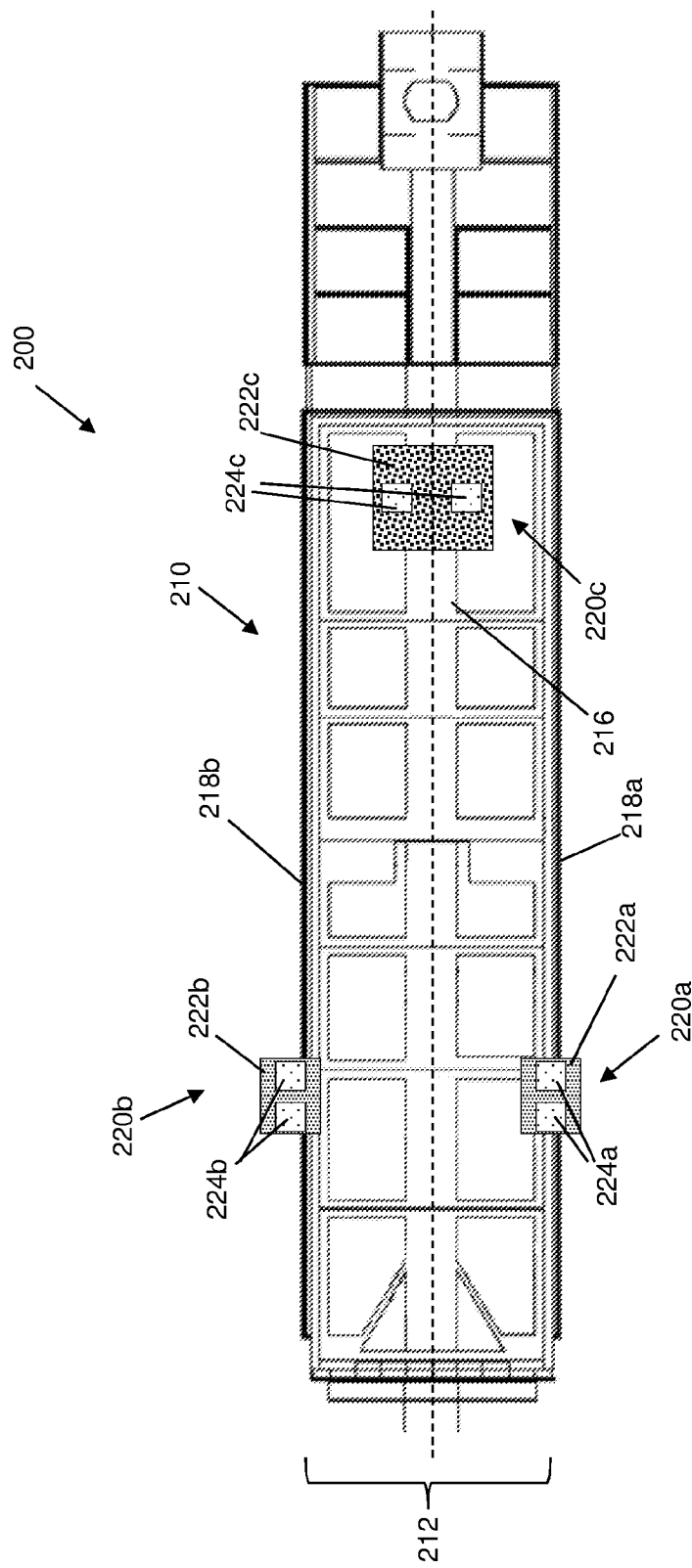
FIG. 4 shows a bottom view of a power generation unit trailer system according to aspects of the present disclosure.

FIG. 4 shows one embodiment of a power generation unit trailer system 200. In this embodiment, a three-point support system is provided. This embodiment not only provides support via landing gears positioned along the perimeter of power generation unit trailer system 200, but also along the center beneath power generation unit trailer system 200. Specifically, FIG. 4 shows a bottom view of a base 212 of a power generation unit trailer 210. Base 212 may be configured to hold at least a portion of a power generation unit (not shown). Base 212 may include a trailer spine 216 which extends longitudinally along the center of trailer 210. Additionally, base 210 may include opposing sides 218a, 218b. In this embodiment, a set of landing gears 220a, 220b, 220c may be attached to base 212. Landing gear 220a may include a support 222a and one or more vibration isolators 224a. Landing gear 220b may include a support 222b and one or more vibration isolators 224b. Supports 222a, 222b and vibration isolators 224a, 224b may include the respective materials/components listed with respect to support 122 and vibration isolator 124. Each support 222a, 222b may be attached to base 212. Each vibration isolator 224a, 224b may be attached to a respective support 222a, 222b and a foundation 114 (FIG. 2) beneath base 212 as described herein. However, it is to be understood that in other embodiments, supports 222a, 222b may be anchored to foundation without the use of vibration isolators 224a, 224b. Rather, supports 222a, 222b may be anchored to foundation directly, for example, via bolts. Bolts may be seated to foundation using any now known or later developed technique; e.g., embedded bolts, clasps, etc. Landing gear 220c may include a plate 222c attached to base 212. Plate 222c may be include solid metal, such as carbon steel, cast iron, aluminum or any other high strength metal capable of withstanding high loads. One or more vibration isolators 224c may extend from and attach to plate 222c. In this embodiment, landing gear 220a and landing gear 220b may be positioned on opposing sides of trailer 210. Additionally, landing gear 220c may be positioned on spine 216 of trailer 210 such that landing gear 220c is substantially centered on base 212 between opposing sides 218a, 218b. Further, in some embodiments, landing gear 220c may be positioned on base 212 such that landing gear 220c is equidistant from landing gear 220a and landing gear 220b. In an alternative embodiment, a support similar to supports 222a, 222b may be substituted for plate 222c of landing gear 220c. Vibration isolators 224a, 224b may be attached to foundation 114 (FIG. 2) via bolts as described herein.

Figure 5:
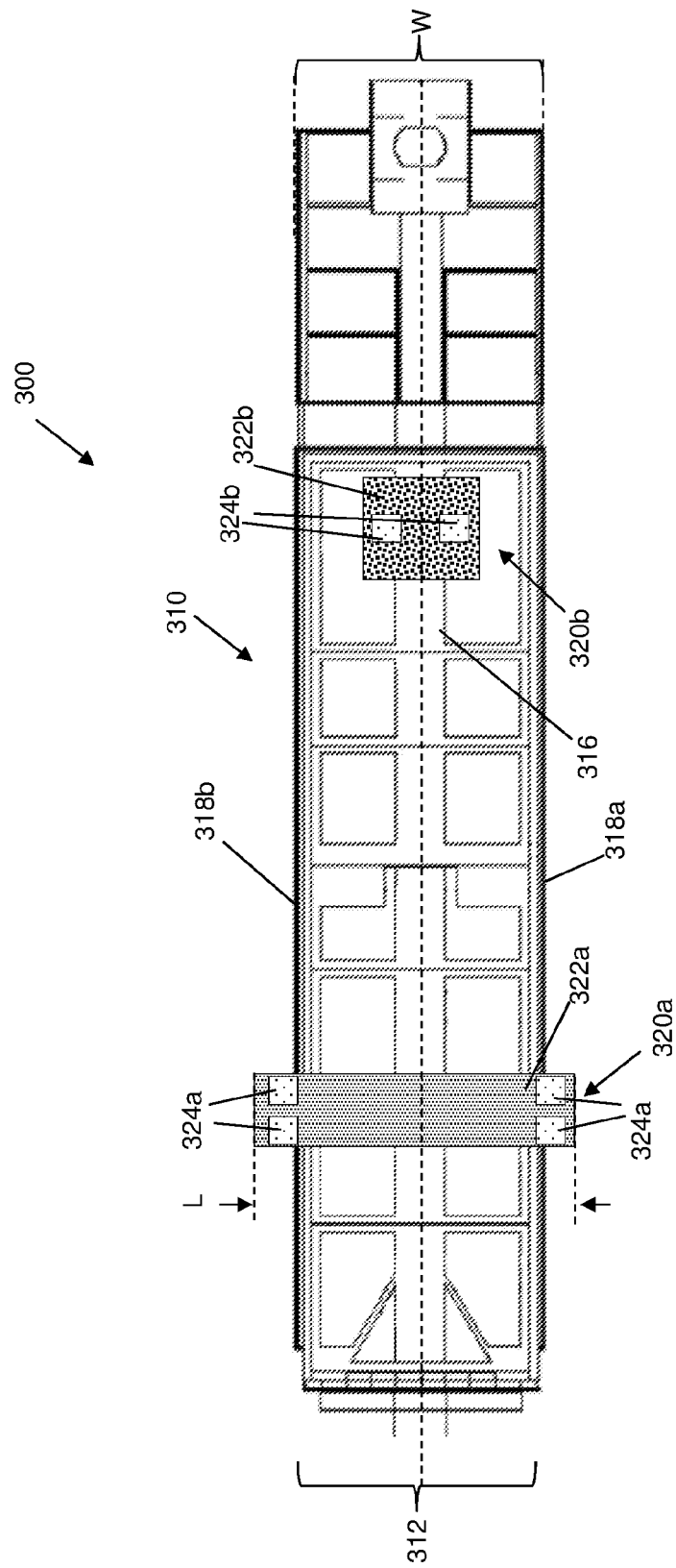
FIG. 5 shows a bottom view of a power generation unit trailer system according to aspects of the present disclosure.

FIG. 5 shows another embodiment of a power generation unit trailer system 300. Specifically, FIG. 5 shows a bottom view of a base 312 of a power generation unit trailer 310. Base 312 may be configured to hold at least a portion of a power generation unit (not shown). Base 310 may include a trailer spine 316 which extends longitudinally along the center of trailer 310. Additionally, base 310 may include opposing sides 318a, 318b. In this embodiment, a set of landing gears 320a, 320b may be attached to base 312. In this embodiment, landing gear 320a may include a support 322a attached to base 312. According to this embodiment, support 322a may include a transverse beam having a length L greater than a width W of trailer 310. Additionally, landing gear 320a may include on or more vibration isolators 324a. While only four vibration isolators are shown, landing gear 320a may include any number of vibration isolators spaced along supports 322a. Support 322a and vibration isolators 224a may include the respective materials/components listed with respect to support 122 and vibration isolator 124. Landing gear 320b may include a plate 322b attached to base 312. Plate 322b may be include solid metal, such as carbon steel, cast iron, aluminum or any other high strength metal capable of withstanding high loads. One or more vibration isolators 324b may extend from and attach to plate 322b. In this embodiment, landing gear 320a and landing gear 320b may be positioned on opposing sides of trailer 210. Additionally, landing gear 320c may be positioned on spine 316 of trailer 310 such that landing gear 320b is substantially centered on base 312 between opposing sides 318a, 318b. In an alternative embodiment, a support similar to supports 222a, 222b (FIG. 2) may be substituted for plate 322b of landing gear 320b. In another alternative embodiment, an additional transverse beam may be substituted for plate 322b. Vibration isolators 324a, 324b may be attached to foundation 114 (FIG. 2) via bolts as described herein. However, it is to be understood that in other embodiments, supports 322a, 322b may be anchored to foundation without the use of vibration isolators 324a, 324b. Rather, supports 322a, 322b may be anchored to foundation directly, for example, via bolts. Bolts may be seated to foundation using any now known or later developed technique; e.g., embedded bolts, clasps, etc.

Figure 6:
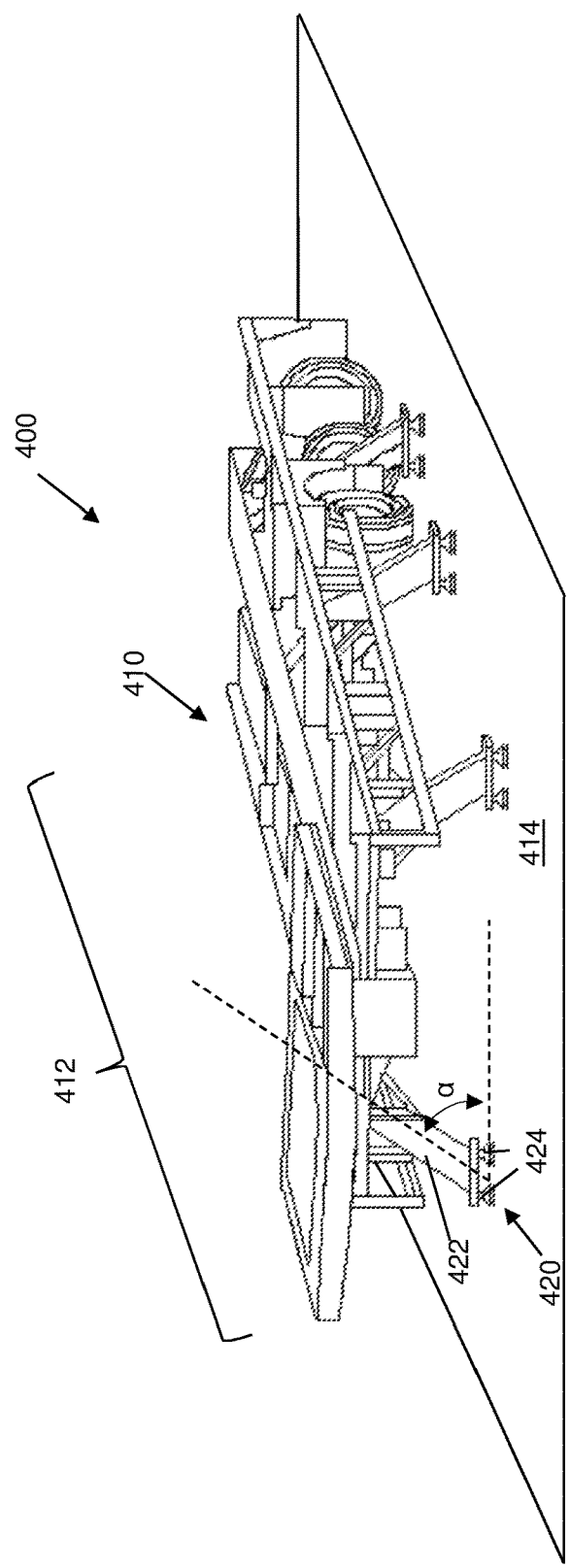
FIG. 6 shows a three perspective view of a power generation unit trailer system according to another aspect of the present disclosure.

FIG. 6 shows a three dimensional view of a power generation unit trailer system 400 according to another embodiment of the disclosure. In this embodiment, landing gears 420 may be attached to base 412 of trailer 410 as described herein. However, supports 422 may be attached to base 412 at an angle α relative to foundation 414. Angle α may be equal to approximately 25° to approximately 75°. Additionally, vibration isolators 424 may be attached to supports 422 and foundation 414 as described herein. Landing gears 420 may be placed intermittently about a perimeter of trailer 410. In some embodiments, landing gears 420 may be spaced evenly about the perimeter of trailer 410. In other embodiments, angled supports 422 may be combined with the plate embodiment as described with reference to FIGS. 4-5.

Figure 1:
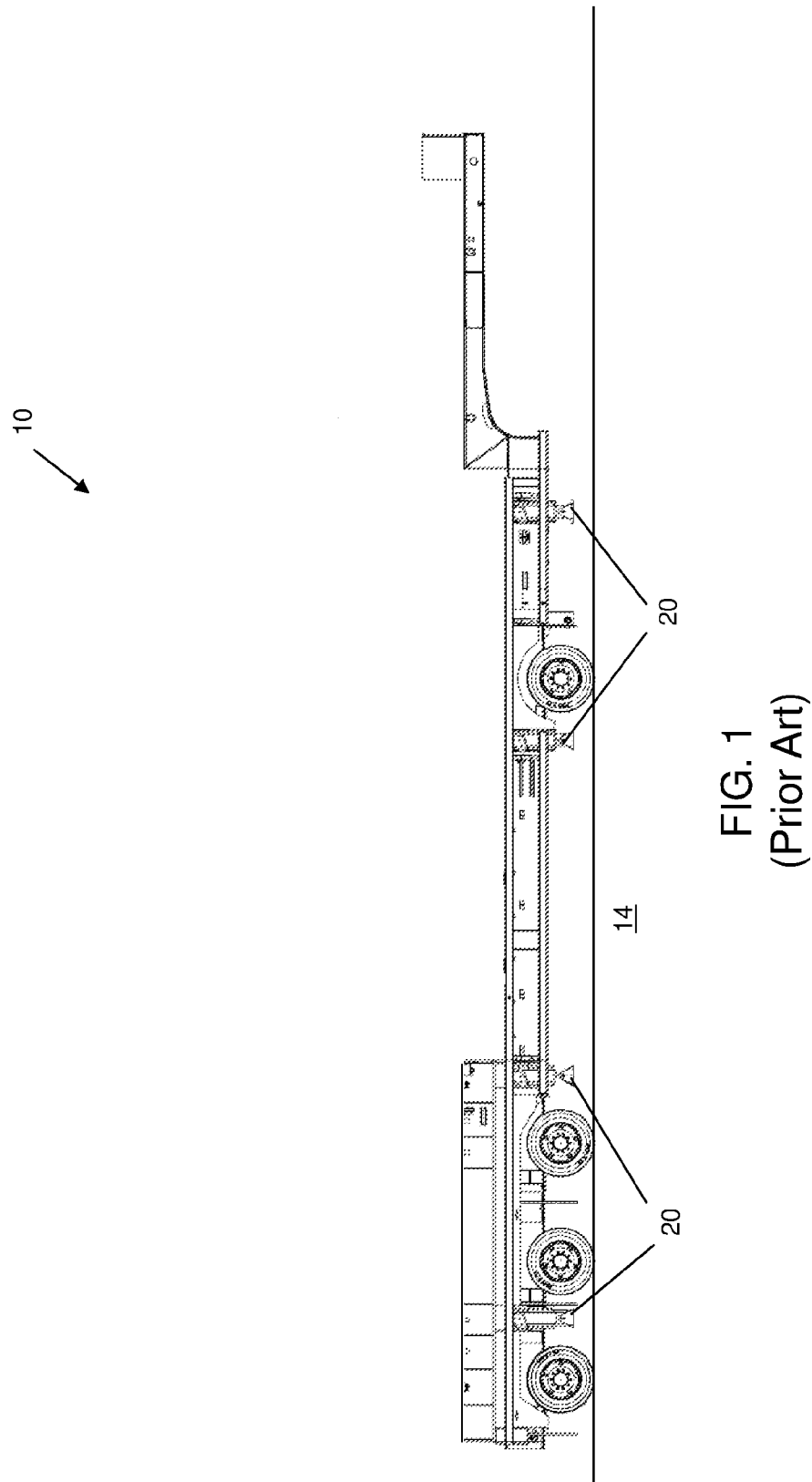
FIG. 1 shows a side view of a conventional mobile power generation unit.

A method for anchoring a trailer system to a foundation beneath the trailer system will now be described with reference to FIGS. 7-8. Trailer system 500 may be configured to hold a power generation unit. Trailer system 500 may include a generator trailer 502 and a turbine trailer 504. As known in the art, generator trailer 502 may be configured to hold a generator 506 and turbine trailer 504 may be configured to hold a turbine 508, such as a gas or steam turbine. In one embodiment, the method may begin by removing existing landing gears 20 from a generator trailer 10 (FIG. 1). A set of landing gears 520a, 520b according to embodiments of the present disclosure may be attached to a base 512 of generator trailer 502. Any of the landing gears discussed with reference to FIGS. 2 and 4-6 may be attached. That is, landing gears 520a, 520b may include a support 522a, 522b and one or more vibration isolators 524a, 524b. Set of landing gears 520a, 520b may be attached by attaching supports 522a, 522b to base 512. Supports 522a, 522b may be attached via welds, bolts, screws, rivets, or other fasteners known in the art which may achieve the same purpose. In some embodiments, supports 522a, 522b may be attached to base 512 of generator trailer 502 at an angle of approximately 90° relative to a foundation 514 beneath base 512. In other embodiments, supports 524a, 524b may be attached to base 512 at an angle of approximately 25° to 75° relative to foundation 514 (similarly to that shown in FIG. 6). In yet another embodiment, attaching landing gears 520a, 520b may include attaching a transverse beam to opposing sides of base 512 of generator trailer 502 (similarly to that shown in FIG. 5). As discussed herein, the transverse beam may have a length greater than a width of trailer 502 such that the transverse beam extends from one of the opposing sides to another. In a further embodiment, at least one landing gear in the set of landing gears 520a, 520b may include a plate placed between opposing sides of generator trailer 502 instead of supports 522a, 522b (similarly to that shown in FIG. 4). Additionally, a vibration isolator 524a, 524b may be attached to supports 522a, 522b.

After landing gears 520a, 520b are attached to generator trailer 502, turbine trailer 504 may be attached generator trailer 502 as is known in the art. Pre-existing landing gears of turbine trailer 504 may be removed and a set of landing gears 520c, 520d according to the present disclosure may be attached to base 542 of turbine trailer 504. Any of the landing gears discussed with reference to FIGS. 2 and 4-6 may be attached. That is, landing gears 520c, 520d may include a support 522c, 522d and one or more vibration isolators 524c, 524d. Set of landing gears 520c, 520d may be attached by attaching supports 522c, 522c to base 542. Supports 522c, 522d may be attached via bolts, screws, rivets, or other fasteners known in the art which may achieve the same purpose. In some embodiments, supports 522c, 522d may be attached to base 542 of turbine trailer 504 at an angle of approximately 90° relative to a foundation 514 beneath base 542. In other embodiments, supports 524c, 524d may be attached to base 542 at an angle of approximately 25° to 75° relative to foundation 514 (similarly to that shown in FIG. 6). In yet another embodiment, attaching landing gears 520c, 520d may include attaching a transverse beam to opposing sides of base 542 of turbine trailer 504 (similarly to that shown in FIG. 5). As discussed herein, the transverse beam may have a length greater than a width of trailer 504 such that the transverse beam extends from one of the opposing sides to another. In a further embodiment, at least one landing gear in the set of landing gears 520c, 520d may include a plate placed between opposing sides of turbine trailer 504 instead of supports 522c, 522d (similarly to that shown in FIG. 4). Additionally, a vibration isolator 524c, 524d may be attached to supports 522c, 522d.

Landing gears 520a, 520b, 520c, 520d may be adjusted to a predetermined height such that base 512 of generator trailer 502 is supported by landing gears 520a, 520b and base 542 of turbine trailer 504 is supported by landing gears 520c, 520d. Once landing gears 520a, 520b, 520c, 520d are attached and adjusted, the method may include anchoring landing gears 520a, 520b, 520c, 520d to a foundation 514 beneath base 512, 542 of trailers 502, 504. More specifically, vibration isolators 524a, 524b, 524c, 524d may be anchored to foundation 514. Vibration isolators 524a, 524b, 524c, 524d may be anchored via bolts which may be inserted in bolt holes 138 of lower casting 134 (FIG. 3) of vibration isolators 524a, 524b, 524c, 524d. However, it is to be understood that in other embodiments, supports 522a, 522b, 522c, 522d may be anchored to foundation without the use of vibration isolators 524a, 524b, 524c, 524d. Rather, supports 522a, 522b, 522c, 522d may be anchored to foundation directly, for example, via bolts. Bolts may be seated to foundation using any now known or later developed technique; e.g., embedded bolts, clasps, etc. Therefore, landing gears 520a, 520b, 520c, 520d provide greater stability and load tolerance than conventional landing gears due to the robust supports 522a, 522b, 522c, 522d and being anchored to foundation 514. Additionally, vibration isolators 524a, 524b, 524c, 524d prevent damage to power generation unit trailer system 500 due to shock during high load conditions.

Figure 7:
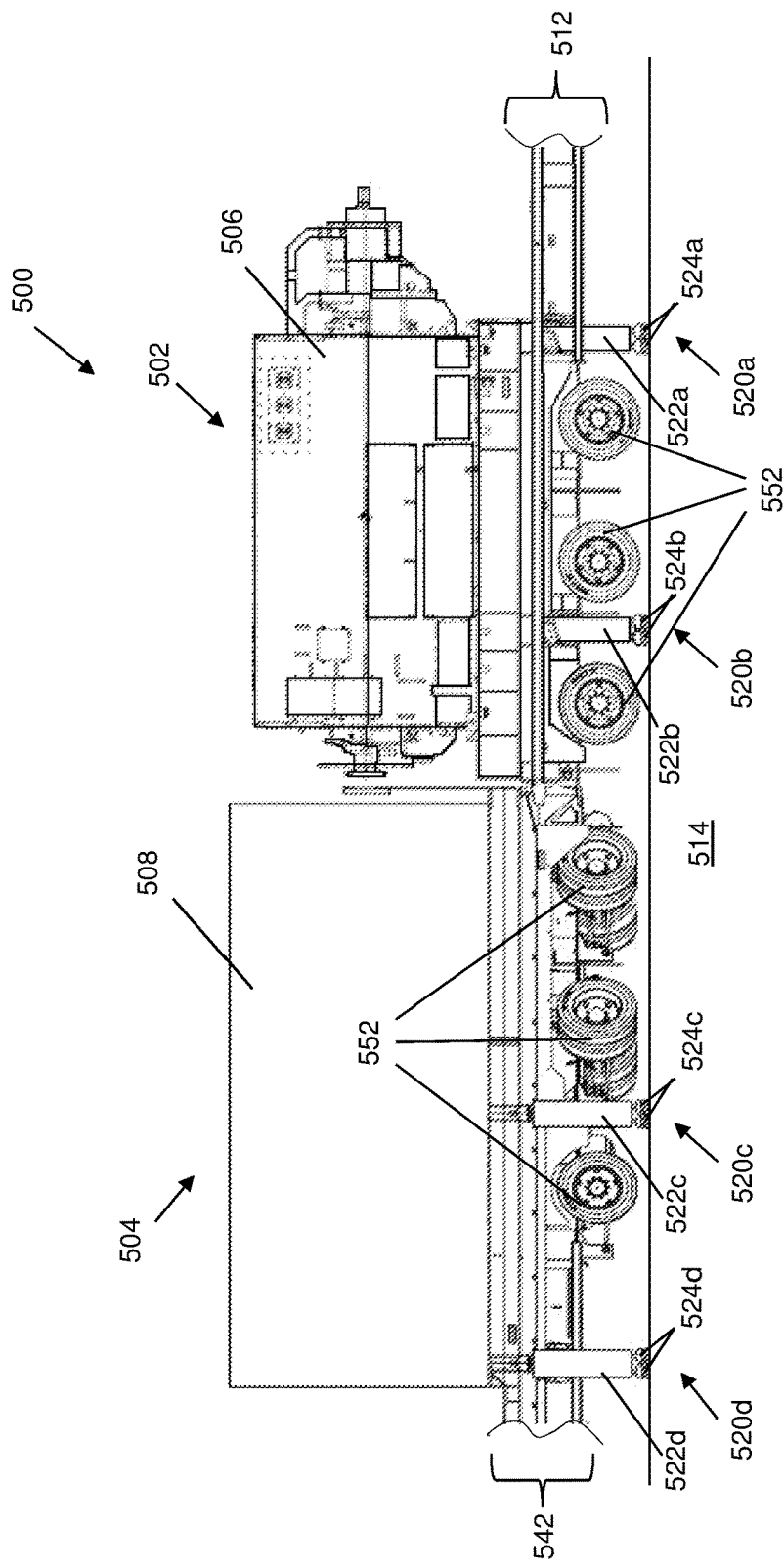
FIG. 7-8 show side view of a power generation unit trailer system undergoing aspects of a method according to the present disclosure.
Figure 8:
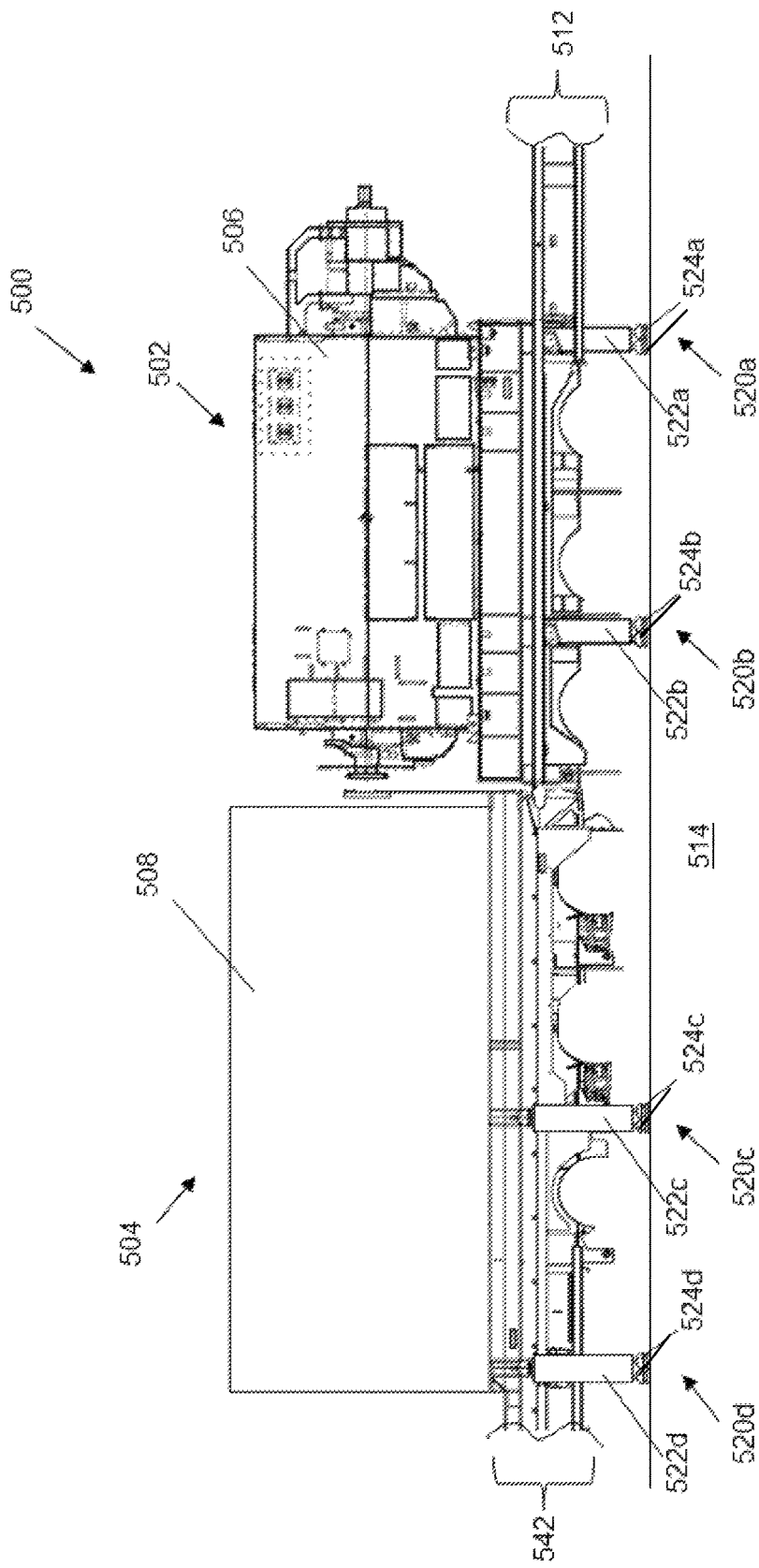

Referring to FIGS. 7-8 together, the method may also include an optional step of removing a set of wheels and axles 552 from generator trailer 502 and turbine trailer 504. In some cases, it may be desirable to keep the set of wheels and axles 552 in place so that power generation unit trailer system 500 can be unanchored from foundation 514 and be used as a mobile power generation unit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended t include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for anchoring a trailer system to a foundation beneath the trailer system, the trailer system configured to hold a power generation unit and including a generator trailer and a turbine trailer, the method comprising:
   attaching a first landing gear to a first base of the generator trailer, wherein the first landing gear is attached to the first base with a first support;
   adjusting the first landing gear to a predetermined height; and
   bolting the first landing gear to the foundation beneath the first base of the generator trailer,
   wherein the trailer system further comprises:
      a second landing gear having a second support attached to the first base; and
      a third landing gear having a first plate attached to the first base.

2. The method of claim 1, further comprising:
   attaching the turbine trailer to the generator trailer and attaching a second landing gear to a second base of the turbine trailer prior to the adjusting the first landing gear to the predetermined height;
   adjusting the second landing gear to a predetermined height; and
   bolting the second landing gear to the foundation beneath the second base of the turbine trailer.

3. The method of claim 1, wherein the attaching the first landing gear to the first base includes attaching a beam to opposing sides of the first base, the beam having a length greater than a width of the trailer.

4. The method of claim 1, further comprising:
   removing a set of axles from the generator trailer and the turbine trailer.

5. The method of claim 1, further comprising, prior to the attaching the first landing gear to the first base of the generator trailer:
   removing a pre-existing landing gears from the generator trailer.

6. The method of claim 1, wherein the foundation includes a floor beneath the first base of the generator trailer.

* * * * *